(12) United States Patent
Saigo

(10) Patent No.: US 8,388,145 B2
(45) Date of Patent: Mar. 5, 2013

(54) IMAGE PROCESSING DEVICE, PROJECTION SYSTEM, AND IMAGE PROCESSING METHOD

(75) Inventor: Manabu Saigo, Shiojiri (JP)

(73) Assignee: Seiko Epson Corporation, Tokyo (JP)

( * ) Notice: Subject to any disclaimer, the term of this patent is extended or adjusted under 35 U.S.C. 154(b) by 451 days.

(21) Appl. No.: 12/568,118

(22) Filed: Sep. 28, 2009

(65) Prior Publication Data
US 2010/0079684 A1 Apr. 1, 2010

(30) Foreign Application Priority Data
Sep. 29, 2008 (JP) ................................. 2008-249806

(51) Int. Cl.
*G03B 21/00* (2006.01)
*G03B 21/14* (2006.01)
*G03B 21/20* (2006.01)

(52) U.S. Cl. ............... 353/69; 353/31; 353/84; 353/85

(58) Field of Classification Search ............ 353/30–31, 353/69–70, 84–85, 121–122
See application file for complete search history.

(56) References Cited

U.S. PATENT DOCUMENTS

| | | | |
|---|---|---|---|
| 6,222,593 B1 * | 4/2001 | Higurashi et al. | 348/745 |
| 6,751,006 B2 * | 6/2004 | Zhou et al. | 359/291 |
| 6,760,075 B2 * | 7/2004 | Mayer et al. | 348/383 |
| 7,079,157 B2 * | 7/2006 | Deering | 345/613 |
| 7,322,700 B2 * | 1/2008 | Miyagaki et al. | 353/31 |
| 2008/0192152 A1 * | 8/2008 | Facius et al. | 348/750 |
| 2008/0218800 A1 * | 9/2008 | Baba | 358/1.18 |
| 2008/0309884 A1 * | 12/2008 | O'Dor et al. | 353/7 |
| 2010/0195003 A1 * | 8/2010 | Saigo | 348/745 |
| 2011/0025875 A1 * | 2/2011 | Imade | 348/222.1 |

FOREIGN PATENT DOCUMENTS

JP 2006-010993 1/2006

OTHER PUBLICATIONS

Mark A. Goforth, "Multispectral image sharpening with multiresolution analysis and the MTF", Proc. SPIE 3372, 123 (1998); doi:10.1117/12.312593.*

* cited by examiner

*Primary Examiner* — Tony Ko
*Assistant Examiner* — Jori S Reilly-Diakun
(74) *Attorney, Agent, or Firm* — Maschoff Gilmore & Israelsen

(57) ABSTRACT

An image processing device in a projection system that includes a first image generation section adapted to project first image on a projection surface and a second image generation section adapted to project second image on the projection surface so as to overlap the first image is disclosed. The image processing device includes: a pixel shift amount calculation section adapted to calculate a pixel shift amount between the first image and the second image; a modulation transfer function (MTF) obtaining section adapted to obtain MTF at a predetermined frequency, corresponding to the pixel shift amount calculated by the pixel shift amount calculation section; a correction filter generation section adapted to generate a correction filter adapted to correct the MTF so that the image displayed on the projection surface has desired sharpness; and a filter applying section adapted to apply the correction filter to image data corresponding to the image.

11 Claims, 5 Drawing Sheets

IMAGE PROCESSING DEVICE, PROJECTION SYSTEM, AND IMAGE PROCESSING METHOD

BACKGROUND

1. Technical Field

The present invention relates to a projection system for projecting a plurality of images in a condition in which positions of corresponding pixels of the images are identical to each other or shifted a predetermined amount from each other, an image processing device, and an image processing method in such a projection system.

2. Related Art

There is known a projection system for projecting a plurality of images in a condition in which positions of corresponding pixels of the images are identical to each other or shifted a predetermined amount from each other. In such a projection system, it is possible to achieve higher resolution of the image displayed on a projection surface by, for example, projecting images respectively from a plurality of projectors (two projectors are assumed here only for the sake of simplicity of explanations), while setting the positions of the corresponding pixels of the two projectors so as to be shifted ½ pixel in a oblique direction from each other. Further, it is possible to achieve higher resolution of the image displayed on the projection surface by projecting images respectively from a plurality of projectors (the two projectors are assumed in the same basis) while setting the positions of the corresponding pixels of the two projectors so as to be identical to each other.

In such projection systems, in either of the cases, it is important for the pixels of the two projectors, corresponding to each other to be kept in an accurately positioned state.

Considering, for example, a projection system (referred to as a first projection system) for performing projection while shifting pixels of two projectors, which correspond to each other, ½ pixel in an oblique direction, even if the positions of the corresponding pixels of the two projectors are accurately adjusted so as to be shifted ½ pixel in the oblique direction from each other when building up the first projection system, pixel shift might be caused in the ideal positions of pixels (referred to as ideal pixel positions) set initially in each of the projectors due to the variation with time. Such pixel shift to the ideal pixel positions also causes degradation in sharpness of the image displayed on a screen as the projection surface.

FIGS. 9A and 9B are diagrams for explaining the pixel shift to the ideal pixel positions. FIG. 9A shows the state in which the pixels corresponding to each other of the two projectors are set in the ideal pixel positions, and in this case, the pixels P11, P12, ... (indicated by outline rectangles) of one projector PJ1 out of the two projectors PJ1, PJ2 and the pixels P21, P22, ... (indicated by gray rectangles) of the other projector PJ2 are in the state in which the pixels (e.g., the pixel P11 and the pixel P21, or the pixel P12 and the pixel P22) corresponding to each other are shifted ½ pixel in an oblique direction from each other. It should be noted that in FIGS. 9A and 9B only an opening section of each pixel in a light modulation element (assumed to be a liquid crystal panel) is shown, but a black matrix section thereof is omitted. This is also applied to FIGS. 6A and 6B explained later.

Further, FIG. 9B shows the case in which the position of the light modulation element is displaced due to some cause in the state shown in FIG. 9A, and the shift (referred to as the pixel shift) with respect to the ideal pixel position (the pixel position shown in FIG. 9A) is caused in the position of each pixel of the light modulation element, and in this case, it is assumed that the pixel shift is caused in each of the pixels of the projector PJ2 based on the position of each of the pixels P11, P12, ... of the projector PJ1.

Here, assuming that the positions of the pixels P21, P22, ... of the projector PJ2 relative to the positions of the pixels P11, P12, ... of the projector PJ1 in the ideal pixel positions are (ri, θi), and the positions of the pixels of the projector PJ2 relative to the positions of the pixels of the projector PJ1 when the shift of the pixels from the ideal pixel positions occur are (rf, θf), the pixel shift amount (r, θ) of the projector PJ2 with respect to the ideal pixel positions can be expressed as the following formula 1.

$$(r, \theta) = (rf - ri, \theta f - \theta i) \tag{1}$$

Therefore, by correcting the pixel shift amount obtained by the formula 1, the positions of the corresponding pixels of the two projectors PJ1, PJ2 can be set to be the ideal pixel positions (see FIG. 9A). It should be noted that as a method of determining the pixel positions (ri, θi) and (rf, θf) of the respective pixels, a method, for example, of adopting a peak position of a luminance distribution of that pixel can be exemplified.

Further, also in the projection system (referred to as a second projection system) having the two projectors PJ1, PJ2 adjusted so that the pixels thereof corresponding to each other are positionally identical to each other, the pixel shift amount from the ideal pixel position can be obtained.

In the first projection system and the second projection system, if the pixel shift with respect to the ideal pixel position occurs, degradation in sharpness of the image displayed on the screen is caused, and therefore, some measures for correcting the degradation in sharpness of the image become necessary. As the measures for correcting the degradation in sharpness of the image, a pixel position correction section for correcting the pixel shift with respect to the ideal pixel positions is provided, and by correcting the pixel shift using the pixel position correction section, the degradation in sharpness of the image can be corrected.

As such a pixel position correction section, for example, a positioning mechanism of the light modulation element capable of fine-adjusting the position of the light modulation element can be exemplified, and a projector incorporating such a positioning mechanism has been known in the past (see, e.g., JP-A-2006-10993 (Document 1)).

The technology disclosed in the Document 1 is for enabling an actuator to fine-adjust the light modulation element, and by providing such a positioning mechanism of the light modulation element to each projector, it becomes possible to correct the pixel shift with respect to the ideal pixel positions.

For example, as shown in FIGS. 9A and 9B, when the pixel shift occurs with respect to the ideal pixel positions in the first projection system for performing projection while shifting the corresponding pixels of the two projectors ½ pixel in an oblique direction, it is possible to correct the positions of the corresponding pixels of the two projectors to be the ideal pixel positions by making the positioning mechanism of the light modulation element operate in one of the two projectors, and it is conceivable that the degradation in sharpness of the image due to the pixel shift with respect to the ideal pixel positions can thus be corrected.

However, since the technology disclosed in the Document 1 is for moving the light modulation element using a mechanical positioning mechanism, it is required to dispose the positioning mechanism with a complicated configuration inside the projector. Therefore, the internal configuration of the projector becomes complicated, and further, downsizing and weight saving of the projector are inhibited. Further, the higher the resolution of the light modulation element becomes, the more accurately the positioning needs to be executed, and the adjustment accuracy of, for example, several hundreds of nanometers might be required. Therefore, the adjustment using a mechanical positioning mechanism such as an actuator might substantially be difficult in some cases.

SUMMARY

Therefore, an advantage of some aspects of the invention is to provide an image processing device, a projection system, and an image processing method capable of appropriately correcting the degradation in sharpness of the image due to the pixel shift without using a mechanical positioning mechanism.

According to an aspect of the invention, there is provided an image processing device in a projection system that includes a first image generation section adapted to project first image on a projection surface and a second image generation section adapted to project second image on the projection surface so as to overlap the first image, the image processing device including a pixel shift amount calculation section adapted to calculate a pixel shift amount between the first image and the second image, a modulation transfer function (MTF) obtaining section adapted to obtain MTF at a predetermined frequency, corresponding to the pixel shift amount calculated by the pixel shift amount calculation section, a correction filter generation section adapted to generate a correction filter adapted to correct the MTF so that the image displayed on the projection surface has desired sharpness, and a filter applying section adapted to apply the correction filter to image data corresponding to the image.

The image processing device according to this aspect of the invention is arranged to calculate the pixel shift amount between the first image and the second image, obtain the MTF at a predetermined frequency, corresponding to the pixel shift amount thus calculated, generate the correction filter for correcting the MTF so that the image displayed on the projection surface has the desired sharpness, and apply the correction filter thus generated to the image data corresponding to the image to be displayed. Thus, the degradation in sharpness of the image due to the pixel shift can be corrected. In general, the sharpness of the image can be represented by the MTF. This aspect of the invention is for generating the correction filter for correcting the MTF so that the image to be displayed on the projection surface has the desired sharpness, and applying the correction filter thus generated to the image data corresponding to the image to be displayed.

As described above, according to the image processing device of this aspect of the invention, since the degradation in sharpness of the image due to the pixel shift with respect to the ideal position is corrected by the image processing, it is possible to eliminate the need for the mechanical positioning mechanism for positioning the light modulation element.

In the image processing device according to the above aspect of the invention, it is preferable that the pixel shift amount calculation section take a state in which positions of pixels of the first image and second image are one of identical to each other and shifted a predetermined amount from each other as ideal pixel positions, and calculates the pixel shift amount with respect to the ideal pixel positions.

In the image processing device according to the above aspect of the invention, it is preferable that there is further provided an MTF obtaining table having the pixel shift amount and the MTF at the predetermined frequency, corresponding to the pixel shift amount so as to correspond to each other, and the MTF obtaining section obtains the MTF at the predetermined frequency, corresponding to the pixel shift amount calculated by the pixel shift amount calculation section using the MTF obtaining table.

The MTF corresponding to the pixel shift amount with respect to the ideal pixel position can easily be obtained by previously creating such MTF obtaining table.

In the image processing device according to the above aspect of the invention, it is preferable that the MTF obtaining table has discrete pixel shift amount and the MTF at the predetermined frequency, corresponding to the discrete pixel shift amount so as to correspond to each other.

As described above, by forming the MTF obtaining table as the table having the discrete pixel shift amount and the MTF at the predetermined frequency, corresponding to the discrete pixel shift amount so as to correspond to each other, the data amount of the MTF obtaining table can be reduced. It should be noted that the MTF corresponding to the pixel shift amount not existing in the MTF obtaining table can be calculated by interpolation.

In the image processing device according to the above aspect of the invention, it is preferable that the predetermined frequency is a frequency of 2 dot/cycle.

Since the MTF becomes smaller at the frequency of 2 dot/cycle (the highest expressible frequency), by generating the correction filter using the MTF only at 2 dot/cycle, the correction filter generated can be a filter appropriately correcting the degradation of the sharpness. Further, by generating the correction filter using the MTF only at 2 dot/cycle, the amount of operation required for generating the correction filter such as calculation of the filter coefficients can significantly be reduced compared to the case of generating the correction filter using the MTF at other frequencies than 2 dot/cycle.

In the image processing device according to the above aspect of the invention, it is preferable that in the state in which the positions of the pixels are shifted a predetermined amount from each other, the positions of the pixels are shifted a predetermined amount from each other in an oblique direction.

As described above, by displaying a plurality of images while shifting the positions of the pixels corresponding to each other a predetermined amount from each other in an oblique direction, it is possible to achieve higher resolution of the image to be displayed on the projection surface.

In the image processing device according to the above aspect of the invention, it is preferable that the correction filter generation section generates the correction filter based on a default filter generated so that the image displayed on the projection surface in the ideal pixel positions has desired sharpness.

In other words, based on the filter (the default filter) generated for correcting the degradation in sharpness of the image corresponding to the ideal pixel positions, the correction filter for correcting the degradation in sharpness of the image in the case in which the pixel shift with respect to the ideal pixel position occurs is generated. Specifically, the filter coefficients of the correction filter are calculated based on the filter coefficients provided to the default filter. Thus, the correction filter for correcting the degradation in sharpness of the image in the case in which the pixel shift with respect to the ideal pixel positions occurs can appropriately be generated with small amount of operation.

In the image processing device according to the above aspect of the invention, it is preferable that the image generation sections are provided respectively to a plurality of projectors.

This relates to the projection system provided with a plurality of projectors and for displaying the images projected from the projectors so as to overlap with each other on the projection surface, and by applying the image processing device of this aspect of the invention to such a projection system, the correction of the degradation in sharpness of the image due to the pixel shift can be performed by the image processing. Thus, it is possible to eliminate the need for the mechanical positioning mechanism for positioning the light modulation element.

In the image processing device according to the above aspect of the invention, it is preferable that the image generation sections are provided to a same projector.

Such a projector is provided with a plurality of image generation sections (two image generation sections, namely the first image generation section and the second image generation section, are assumed here), a combining optical system for combining the images generated respectively by the first image generation section and the second image generation section, and a projection optical system for projecting the image obtained by the combining optical system, and the projection system using such a projector can also display a plurality of images so as to overlap with each other on the projection surface. Therefore, the image processing device according to this aspect of the invention can be applied to the projection system provided with such a projector.

According to another aspect of the invention, there is provided a projection system including a first image generation section adapted to project first image on a projection surface, a second image generation section adapted to project second image on the projection surface so as to overlap the first image, and an image processing device adapted to perform image processing on the first image and the second image. The image processing device includes a pixel shift amount calculation section adapted to calculate a pixel shift amount between the first image and the second image, a modulation transfer function (MTF) obtaining section adapted to obtain MTF at a predetermined frequency, corresponding to the pixel shift amount calculated by the pixel shift amount calculation section, a correction filter generation section adapted to generate a correction filter adapted to correct the MTF so that the image displayed on the projection surface has desired sharpness, and a filter applying section adapted to apply the correction filter to image data corresponding to the image.

By providing such an image processing device to the projection system according to this aspect of the invention, substantially the same advantages as described with respect to the image processing device of the aspect of the invention can be obtained. It should be noted that it is preferable to provide the features of the image processing device according to the aspect of the invention described above to the projection system according to this aspect of the invention.

According to still another aspect of the invention, there is provided an image processing method including the steps of (a) projecting a first image on a projection surface, (b) projecting a second image on the projection surface so as to overlap the first image, (c) calculating a pixel shift amount between the first image and the second image, (d) obtaining a modulation transfer function (MTF) at a predetermined frequency, corresponding to the pixel shift amount calculated in step (c), (e) generating a correction filter adapted to correct the MTF so that the image displayed on the projection surface has desired sharpness, and (f) applying the correction filter to image data corresponding to the image.

By applying the image processing method according to this aspect of the invention to the projection system described above, substantially the same advantages as described with respect to the image processing device of the aspect of the invention can be obtained. It should be noted that it is preferable to provide the features of the image processing device according to the aspect of the invention described above to the image processing method according to this aspect of the invention.

BRIEF DESCRIPTION OF THE DRAWINGS

The invention will now be described with reference to the accompanying drawings, wherein like numbers reference like elements.

DESCRIPTION OF EXEMPLARY EMBODIMENTS

Hereinafter, some embodiments of the invention will be explained.

First Embodiment

Figures 9A, 9B:
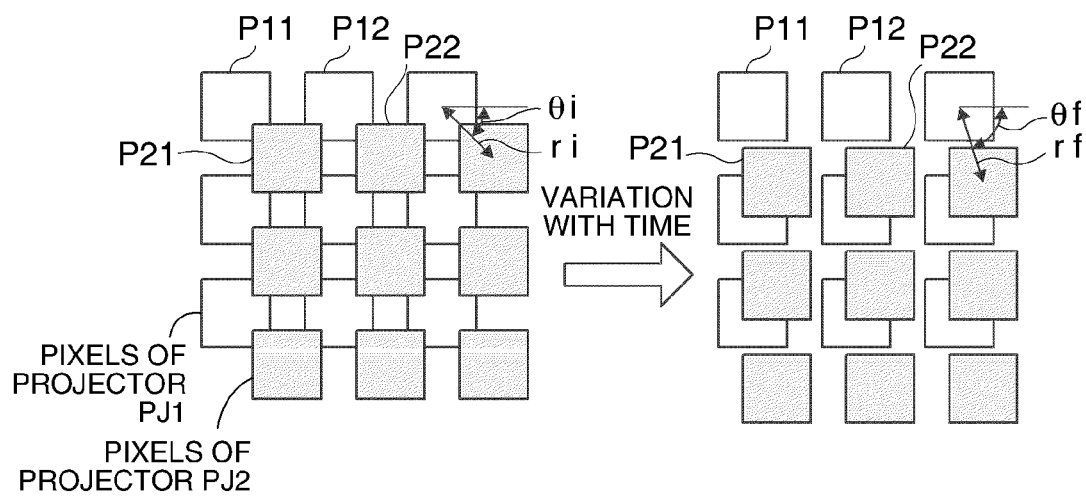
FIGS. 9A and 9B are diagrams for explaining the pixel shift with respect to the ideal pixel positions.

The projection system 10 according to the first embodiment is a projection system in which the positions of the pixels of two projectors corresponding to each other are set so as to be shifted ½ pixel from each other in an oblique direction as shown in FIG. 9A.

Figure 1:
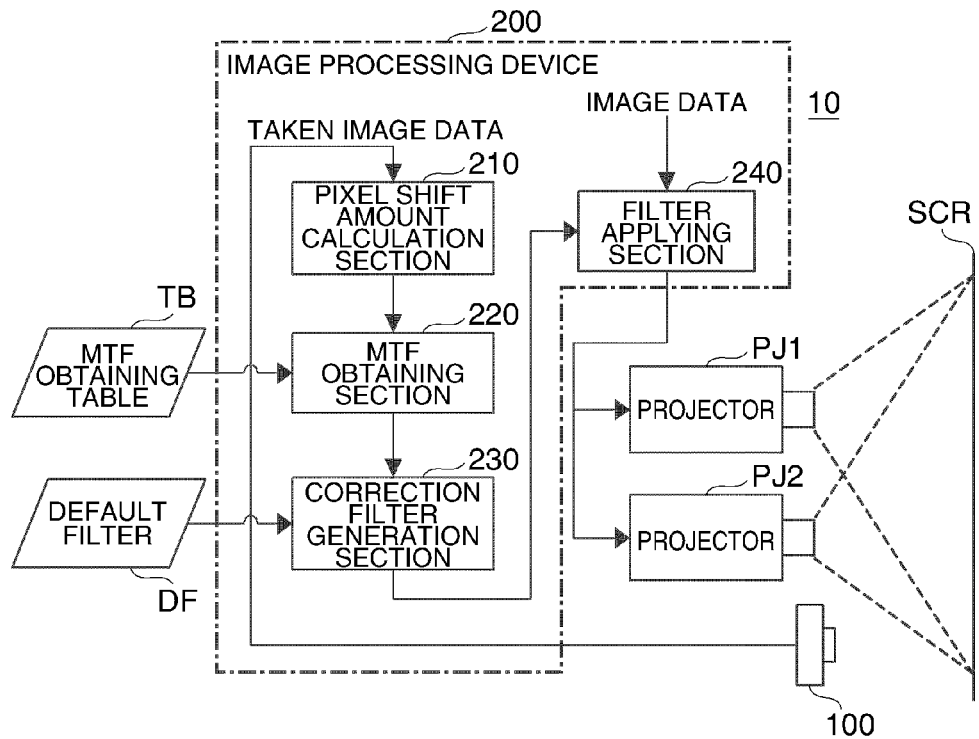
FIG. 1 is a diagram showing a configuration of a projection system 10 according to a first embodiment.

FIG. 1 is a diagram showing a configuration of the projection system 10 according to the first embodiment. As shown in FIG. 1, the projection system 10 according to the first embodiment is provided with two projectors PJ1, PJ2 for projecting an image on a screen SCR as a projection surface, an image taking device 100 for taking the image projected on the screen SCR, and an image processing device 200 for executing image processing for correcting the degradation of the sharpness based on the taken image data output from the image taking device 100.

The image processing device 200 is provided with a pixel shift amount calculation section 210 for calculating the pixel shift amount $(r, \theta)$ with respect to the ideal pixel positions (see FIG. 9A) of the pixels (e.g., a pair of pixels P11 and P21, and a pair of pixels P12 and P22) of the projectors PJ1, PJ2 corresponding to each other, an MTF obtaining section 220 for obtaining the MTF (the MTF in this case is denoted as M(r, θ)) at a predetermined frequency (assumed to be the frequency of 2 dot/cycle) corresponding to the pixel shift amount (r, θ) calculated by the pixel shift amount calculation section 210 by looking up an MTF obtaining table TB, a correction filter generation section 230 for generating a correction filter for correcting the MTF so that the image displayed on the screen SCR is provided with desired sharpness based on a default filter (referred to as a default filter) DF, and a filter applying section 240 for applying the correction filter thus generated to the image data.

It should be noted that the pixel shift amount (r, θ) with respect to the ideal pixel positions of the pixels of the projectors PJ1, PJ2 corresponding to each other can be expressed as the formula 1 described above. Further, the default filter DF is a filter for correcting the lowering of the MTF corresponding to the case in which the pixels of the projectors PJ1, PJ2 corresponding to each other are at the ideal pixel positions, and a filter created based on the MTF corresponding to the case in which the pixels corresponding to each other are at the ideal pixel positions.

Figure 2:
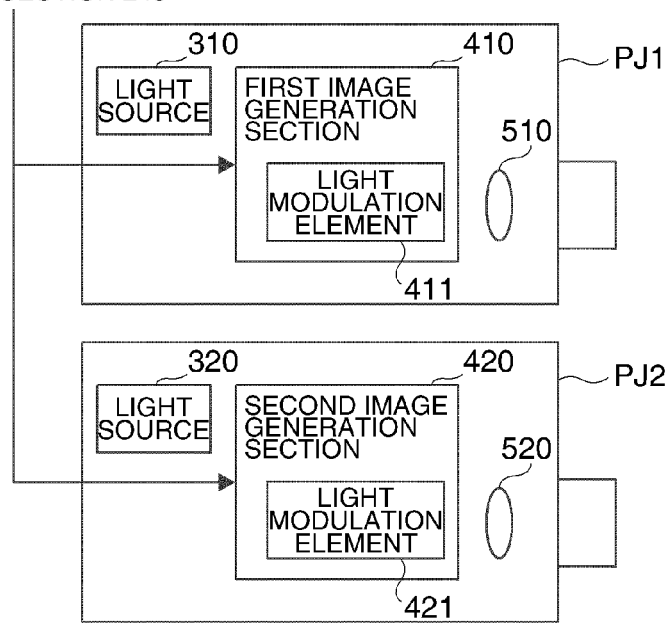
FIG. 2 is a diagram schematically showing a part of a configuration of projectors PJ1, PJ2 used in the projection system 10 according to the first embodiment.

FIG. 2 is a diagram schematically showing a part of a configuration of the projectors PJ1, PJ2 used in the projection system 10 according to the first embodiment. As shown in FIG. 2, the projector PJ1 is provided with a first image generation section 410 having a light source 310 and a light modulation element 411, and a projection optical system 510, and similarly, the projector PJ2 is provided with a second image generation section 420 having a light source 320 and a light modulation element 421, and a projection optical system 520.

It should be noted that FIG. 2 shows only constituents necessary for explaining the projection system 10 according to the first embodiment, and although the first image generation section 410 and the second image generation section 420, for example, are provided with various constituents such as color separation optical systems or cross dichroic prisms besides the light modulation elements 411, 421, illustrations and explanations of such constituents will be omitted.

Further, in the case in which the projectors PJ1, PJ2 are each a three plate projector provided with three light modulation elements corresponding respectively to the colors of RGB, the light modulation element 411 and the light modulation element 421 are each composed of three light modulation elements (not shown) corresponding respectively to RGB.

Figure 3:
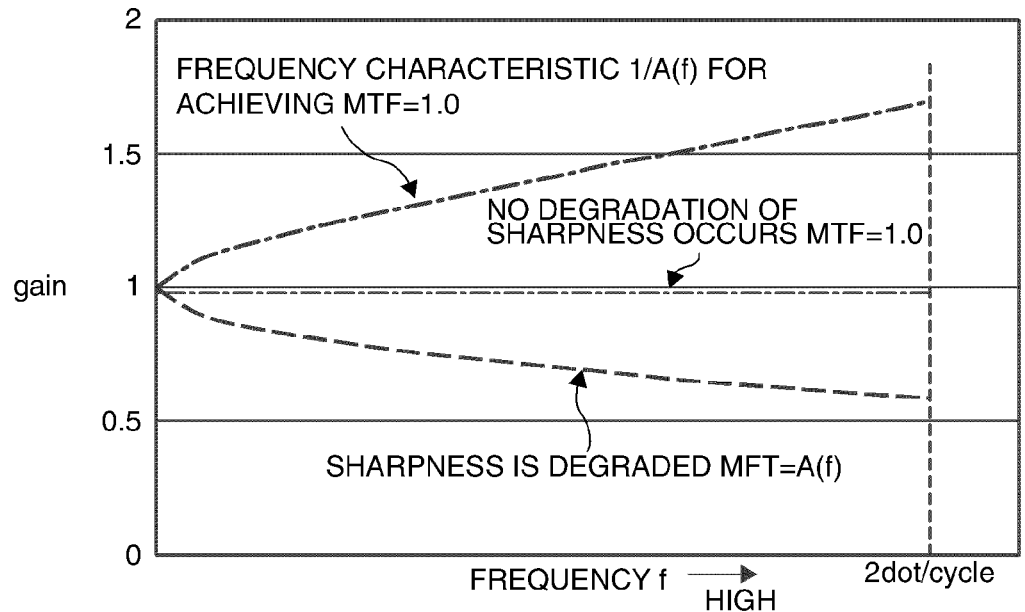
FIG. 3 is a diagram for explaining sharpness of an image.

FIG. 3 is a diagram for explaining sharpness of an image. FIG. 3 shows a relationship between a spatial frequency (simply referred to as a frequency) and the MTF. As illustrated by a thin dashed line in FIG. 3, MTF=1.0 is satisfied at any frequency if no degradation in sharpness of the image occurs, and as illustrated by a broken line in FIG. 3, if the degradation in sharpness of the image occurs, MTF<1 is kept, and the MTF becomes even lower on the high frequency component side. As described above, the sharpness of the image can be represented by the MTF.

Such lowering of the MTF due to the degradation in sharpness of the image can be corrected by applying a filter having a frequency characteristic forming an inverse function thereof. In other words, assuming the frequency characteristic corresponding to the lowered MTF as A(f), as illustrated by a thick dashed line in FIG. 3, the lowering of the MTF can be corrected by applying the filter having the frequency characteristic of 1/A(f) forming the inverse function thereof.

Incidentally, the MTF is also lowered simply by setting the positions of the pixels of the projectors PJ1, PJ2 corresponding to each other (to the ideal pixel positions) so as to be shifted ½ pixel from each other in an oblique direction as shown in FIG. 9A in order for achieving a higher resolution of the image. It should be noted that in the projection system 10 according to the first embodiment, although the expression "pixels of the two projectors corresponding to each other" actually denotes the pixels of the light modulation element 411 provided to the first image generation section 410 provided to the projector PJ1 and the pixels of the light modulation element 421 provided to the second image generation section 420 provided to the projector PJ2, the pixels corresponding to each other, the description of "pixels of the two projectors PJ1, PJ2 corresponding to each other" is used in the projection system 10 according to the first embodiment.

Figure 4:
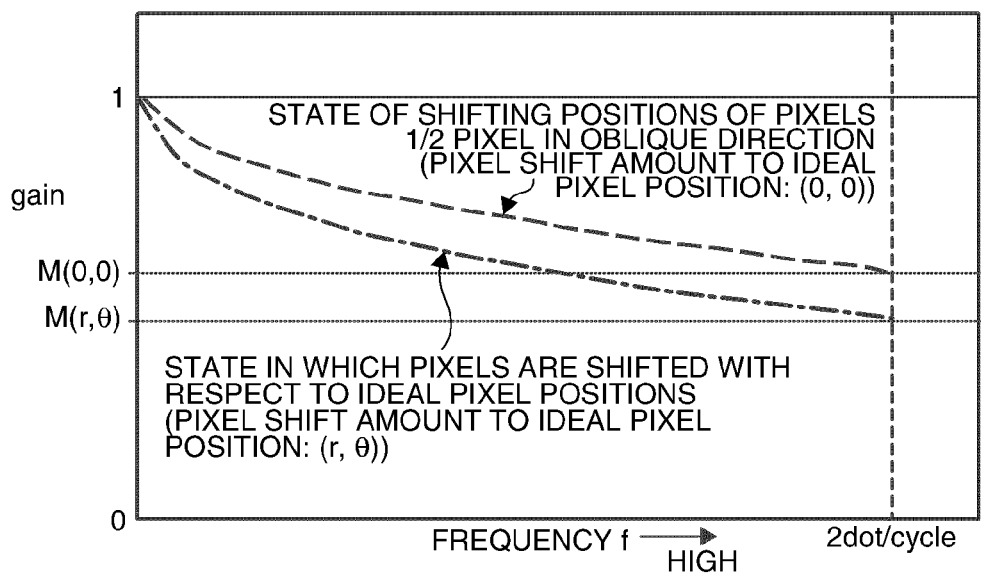
FIG. 4 is a diagram for explaining the MTF when setting the pixels of the two projectors PJ1, PJ2 corresponding to each other (in the ideal pixel positions) so as to be shifted ½ pixel from each other in an oblique direction.

FIG. 4 is a diagram for explaining the MTF when setting the pixels of the two projectors PJ1, PJ2 corresponding to each other (in the ideal pixel positions) so as to be shifted ½ pixel from each other in an oblique direction. Even in the case in which the pixels of the two projectors corresponding to each other are set at the ideal pixel positions, the MTF becomes lowered as illustrated by a broken line in FIG. 4. The pixel shift amount to the ideal pixel position in this case is (0, 0), and the MTF at 2 dot/cycle corresponding to this pixel shift amount (0, 0) is expressed as M(0, 0). The reason that the MTF is thus lowered even in the case of setting the positions of the pixels to be the ideal pixel positions is that the shift of ½ pixel causes an overlapping area partially between one pixel and the other pixel of the respective projectors PJ1, PJ2 corresponding to each other.

The lowering of the MTF in the case of setting the positions of the pixels to be the ideal pixel positions illustrated by a broken line in FIG. 4 can be corrected by previously generating the filter with the frequency characteristic forming the inverse function with respect to the frequency characteristic corresponding to the lowering of the MTF as the default filter DF, and then applying the default filter DF thus generated as explained with reference to FIG. 3.

On the other hand, if the pixel shift occurs (see, e.g., FIG. 9B) with respect to the ideal pixel positions due to the variation with time or the like after setting the positions of the pixels of the projectors PJ1, PJ2 corresponding to each other to be the ideal pixel positions (see FIG. 9A), the MTF is further lowered as illustrated by a dashed line in FIG. 4. The pixel shift amount to the ideal pixel position in this case is (r, θ), and the MTF at 2 dot/cycle corresponding to this pixel shift amount (r, θ) is expressed as M(r, θ).

As described above, in the case in which the pixel shift occurs with respect to the ideal pixel position, the MTF is further lowered than the MTF corresponding to the ideal pixel position. Therefore, it is not possible to correct the lowering of the MTF in the case of causing the pixel shift with respect to the ideal pixel positions, and to achieve MTF=1.0 by the default filter DF generated for correcting the lowering of the MTF corresponding to the ideal pixel position. Therefore, the image processing as described below is executed in the present embodiment of the invention.

Figure 5:
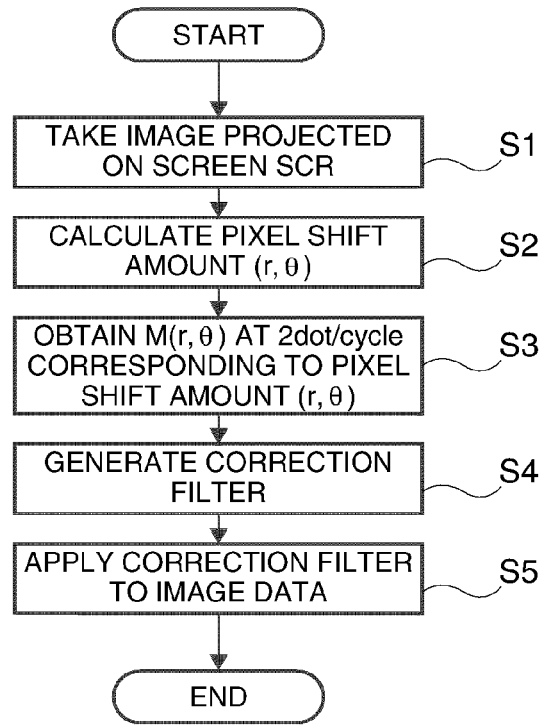
FIG. 5 is a flowchart for explaining image processing in the projection system 10 according to the first embodiment.

FIG. 5 is a flowchart for explaining the image processing in the projection system according to the first embodiment. Firstly, the image projected on the screen SCR from the projectors PJ1, PJ2 is taken as an image by the image taking device 100 (step S1). Then, the pixel shift calculation section 210 calculates the pixel shift amount (r, θ) with respect to the ideal pixel position based on the taken image data output from the image taking device 100 (step S2). The pixel shift amount (r, θ) with respect to the ideal pixel position can be calculated along the formula 1 described above. It should be noted that the pixel shift amount (r, θ) with respect to the ideal pixel position will hereinafter be simply referred to as the pixel shift amount (r, θ).

When the pixel shift amount (r, θ) is obtained, the MTF obtaining section 220 obtains M(r, θ) at 2 dot/cycle corresponding to the pixel shift amount (r, θ) thus calculated by looking up the MTF obtaining table TB (step S3).

The MTF obtaining table TB is a table having the discrete pixel shift amount (r, θ) and M(r, θ) at 2 dot/cycle corresponding to the discrete pixel shift amount so as to correspond to each other, and M(r, θ) at 2 dot/cycle corresponding to the discrete pixel shift amount (r, θ) has been obtained previously. It should be noted that M(r, θ) corresponding to the pixel shift amount (r, θ) not existing in the MTF obtaining table TB can be calculated by interpolation.

Subsequently, the correction filter generation section 230 adjusts the gain of the default filter DF based on M(r, θ) obtained from the MTF obtaining table TB, and generates the correction filter having filter coefficients capable of correcting the MTF to MTF=1.0 taking account of the lowering of the MTF due to the pixel shift with respect to the ideal pixel position (step S4).

Here, when denoting the filter coefficients of the default filter with the filter size of N×N as $h_0[i, j]$ (where, i, j=−(N−1)/2 through (N−1)/2), the filter coefficients h[i, j] of the correction filter for correcting the MTF corresponding to the case in which the pixel shift occurs with respect to the ideal pixel position to be 1.0 can approximately be expressed as the following formulas 2 and 3. It should be noted that the formula 2 corresponds to i, j=0, and the formula 3 corresponds to i, j≠0.

$$h[0,0]=(h_0[0,0]-1) \times g(r,\theta)+1 \quad (2)$$

$$h[i,j]=h_0[i,j] \times g(r,\theta) \quad (3)$$

In the formulas 2 and 3, $g(r, \theta)$ is a coefficient for determining the correction amount, and can be expressed as follows.

$$g(r,\theta)=\{1/M(r,\theta)-1\}/\{1/M(0,0)-1\} \quad (4)$$

It should be noted that M(r, θ) in formula 4 is the MTF at 2 dot/cycle corresponding to the pixel shift amount (r, θ), and M(0, 0) is the MTF at 2 dot/cycle corresponding to the ideal pixel position.

When the correction filter (the correction filter for correcting the MTF to be 1.0) obtained by adjusting the gain of the default filter DF is calculated in the manner as described above, the filter applying section 240 applies the correction filter thus calculated to the image data (step S5). The series of process corresponding to the steps S1 through S4 is executed in real time.

Figures 6A, 6B:
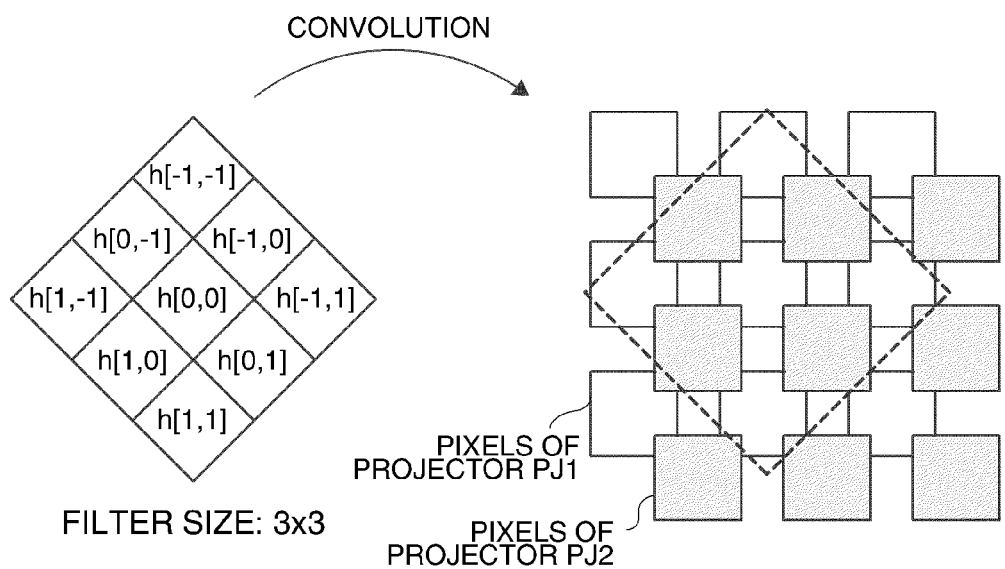
FIGS. 6A and 6B are diagrams for explaining an example of applying a correction filter to image data.

FIGS. 6A and 6B are diagrams for explaining an example of applying the correction filter to the image data. In the case in which the pixels of the projectors PJ1, PJ2 corresponding to each other are shifted ½ pixel in an oblique direction, the filter applying section 240 rotates the correction filter (assuming that the filter size is 3×3) thus generated in the step S4 shown in FIG. 5 45 degree (see FIG. 6A), and then performs convolution on the image data corresponding to the image to be projected (see FIG. 6B). The image data to which the correction filter is thus applied is input to the projectors PJ1, PJ2.

As described above, even in the case in which the positions of the pixels of the projectors PJ1, PJ2 corresponding to each other are shifted with respect to the ideal pixel positions, the MTF can be corrected to be MTF=1.0 by applying (see FIGS. 6A and 6B) the correction filter generated in the steps S1 through S4 shown in FIG. 5 to the image data, thus the degradation in sharpness of the image can be corrected.

It should be noted that although the MTF obtaining table TB used in the projection system 10 according to the first embodiment is formed as the table having the discrete pixel shift amount and M(r, θ) at 2 dot/cycle corresponding to the discrete pixel shift amount so as to correspond to each other, the MTF obtaining table TB is preferably formed as the MTF obtaining table capable of obtaining M(r, θ) in other frequencies than 2 dot/cycle in a normal situation.

By using such an MTF obtaining table, the MTF in other frequencies than 2 dot/cycle can be obtained, and by calculating the filter coefficients using the MTF thus obtained, the correction filter capable of performing further appropriate correction can be generated. It should be noted that if the MTF obtaining table capable of obtaining M(r, θ) in other frequencies than 2 dot/cycle is created, the data amount of the MTF obtaining table increases, and at the same time, the amount of operation for calculating the filter coefficients also increases.

In contrast, by adopting the table for obtaining M(r, θ) at 2 dot/cycle as the MTF obtaining table TB used in the projection system 10 according to the embodiment 1, the data amount of the MTF obtaining table can be reduced, and further, the amount of operation for calculating the filter coefficients can be reduced. Therefore, it is possible to determine whether the MTF obtaining table capable of obtaining M(r, θ) in 2 dot/cycle is adopted or the MTF obtaining table capable of obtaining M(r, θ) in other frequencies than 2 dot/cycle is adopted in consideration of the operation performance and the capacity of the memory of the projection system, the type of image to be displayed, and so on.

Second Embodiment

The projection system 20 according to the second embodiment is a projection system provided with one projector, and two image generation sections (a first image generation section and a second image generation section) are provided to the one projector. Further, the projection system 20 takes the state, in which the pixels of the light modulation element provided to the first image generation section and the pixels of the light modulation element provided to the second image generation section corresponding to each other are identical to each other or shifted a predetermined amount, as the ideal pixel positions, and displays the images generated respectively by the first image generation section and the second image generation section so as to overlap with each other on the screen SCR.

Figure 7:
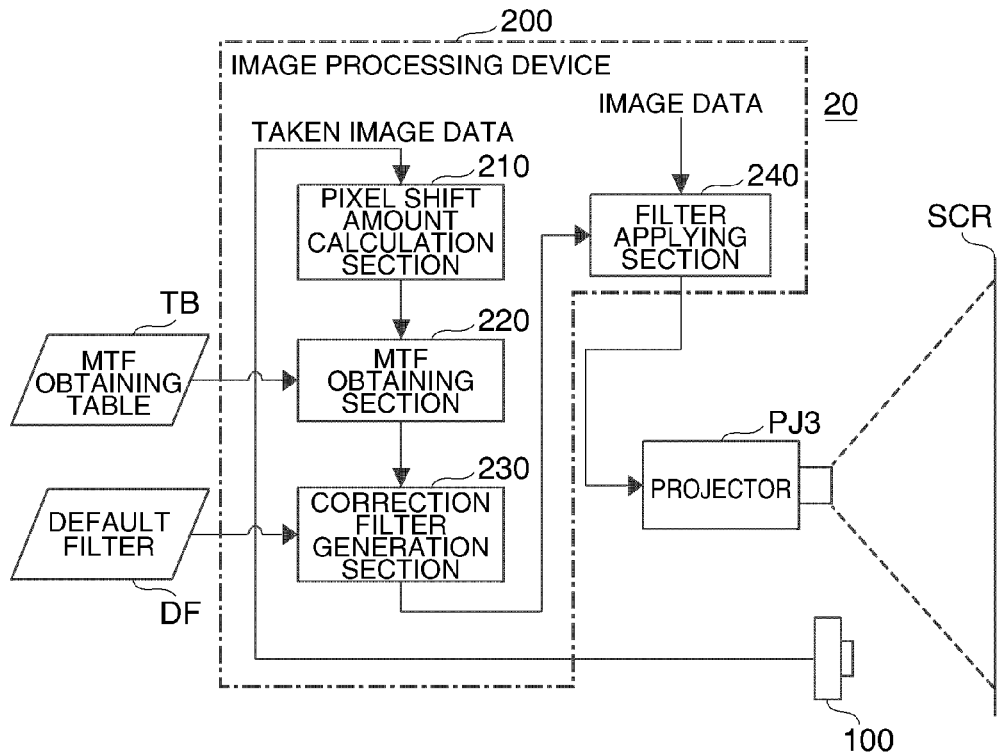
FIG. 7 is a diagram showing a configuration of a projection system 20 according to a second embodiment.

FIG. 7 is a diagram showing a configuration of the projection system 20 according to the second embodiment. As shown in FIG. 7, the projection system 20 according to the second embodiment is provided with a projector PJ3 capable of projecting two images on the screen SCR so as to overlap with each other, an image taking device 100 for taking the image projected on the screen SCR, and an image processing device 200 for executing image processing for correcting the degradation of the sharpness based on the taken image data output from the image taking device 100.

In the projection system 20 according to the second embodiment, the same constituents as those of the projection system 10 according to the first embodiment are provided with the same reference numerals. The projection system 20 according to the second embodiment is different from the projection system 10 according to the first embodiment in that the projection system 20 according to the second embodiment has the projector PJ3 provided with two image generation sections (the first image generation section 410 and the second image generation section 420).

Figure 8:
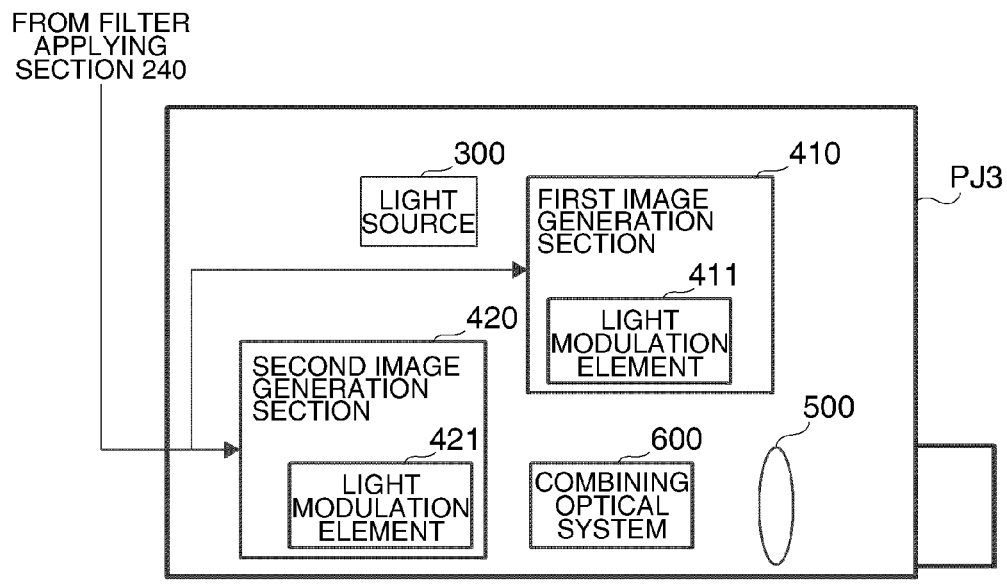
FIG. 8 is a diagram schematically showing a part of a configuration of a projector PJ3 used in the projection system 20 according to the second embodiment.

FIG. 8 is a diagram schematically showing a part of a configuration of the projector PJ3 used in the projection system 20 according to the second embodiment. As shown in FIG. 8, the projector PJ3 is provided with a light source 300, the first image generation section 410, the second image generation section 420, a combining optical system 600 for combining the images generated respectively by the first image generation section 410 and the second image generation section 420, and a projection optical system 500 for projecting the image obtained by the combining optical system 600.

Further, the first image generation section 410 is provided with the light modulation element 411, and the second image generation section 420 is provided with the light modulation element 421. It should be noted that, similarly to the projection system 10 according to the first embodiment, in the case in which the projector PJ3 is the three plate projector provided with the three light modulation elements corresponding respectively to the colors of RGB, the light modulation element 411 and the light modulation element 421 are each composed of the three light modulation elements (not shown) corresponding respectively to RGB.

Further, it is assumed that the projector PJ3 is set to have the pixels of the light modulation element 411 provided to the first image generation section 410 and the light modulation element 421 provided to the second image generation section 420 corresponding to each other in the state (ideal pixel positions) of being shifted ½ pixel in an oblique direction.

Also in the projection system 20 according to the second embodiment thus configured, the lowering of the MTF in the case in which the shift (the pixel shift with respect to the ideal pixel position) is caused in the positions of the pixels of the light modulation element 411 provided to the first image generation section 410 and the light modulation element 421 provided to the second image generation section 420 corresponding to each other can be corrected by performing substantially the same image processing as in the projection system 10 according to the first embodiment. Thus, the degradation in sharpness of the image due to the pixel shift with respect to the ideal pixel position can be corrected. It should be noted that since the image processing for correcting the lowering of the MTF has already been explained in the explanation of the projection system 10 according to the first embodiment, the explanation thereof will be omitted here.

It should be noted that the invention is not limited to the embodiments described above, but the modifications thereof as described in the following items 1 through 4 are also possible within the scope of the invention.

1. Although in each of the embodiments, there is explained the case in which the two images are displayed so as to overlap with each other in the state of shifting the positions of the pixels of the light modulation element 411 provided to the first image generation section 410 and the light modulation element 421 provided to the second image generation section 420 corresponding to each other a predetermined amount (½ pixel) from each other, the invention can also be applied in the case in which the two images are displayed so as to overlap with each other in the state of matching the pixels of the light modulation element 411 provided to the first image generation section 410 and the light modulation element 421 provided to the second image generation section 420 corresponding to each other for the purpose of achieving the higher resolution of the image.

2. Although in each of the embodiments there is explained the example of performing the correction of achieving MTF=1.0, the desired sharpness might be obtained by the correction of achieving MTF≈1.0 depending on the type of the image to be displayed and so on. Therefore, it is not necessarily required to achieve MTF=1.0 in all of the images, and it is also possible to appropriately set the degree of the correction of the degradation of the sharpness depending on the type of the image to be displayed and so on.

3. Although in each of the embodiments the positions of the pixels are expressed in polar coordinate, it is also possible to express them in Cartesian coordinates.

4. Although in the projection system according to the first embodiment, the two projectors are used, three or more projectors can also be used.

The entire disclosure of Japanese Patent Application No. 2008-249806, filed Sep. 29, 2008 is expressly incorporated by reference herein.

What is claimed is:

1. An image processing device in a projection system that includes a first image generation section adapted to project first image on a projection surface and a second image generation section adapted to project second image on the projection surface so as to overlap the first image, the image processing device comprising:
a pixel shift amount calculation section which calculates a pixel shift amount between the first image and the second image;
a modulation transfer function (MTF) obtaining section which obtains MTF at a predetermined frequency by looking up a stored MTF obtaining table and obtaining the MTF at the predetermined frequency which corresponds to the pixel shift amount calculated by the pixel shift amount calculation section;
a correction filter generation section which generates a correction filter adapted to correct the MTF so that the image displayed on the projection surface has desired sharpness; and
a filter applying section which applies the correction filter to image data corresponding to the image.

2. The image processing device according to claim 1, wherein
the pixel shift amount calculation section take a state in which positions of pixels of the first image and second image are one of identical to each other and shifted a predetermined amount from each other as ideal pixel positions, and calculates the pixel shift amount with respect to the ideal pixel positions.

3. The image processing device according to claim 1, further comprising:
an MTF obtaining table having the pixel shift amount and the MTF at the predetermined frequency, corresponding to the pixel shift amount so as to correspond to each other,
wherein the MTF obtaining section obtains the MTF at the predetermined frequency, corresponding to the pixel shift amount calculated by the pixel shift amount calculation section using the MTF obtaining table.

4. The image processing device according to claim 3, wherein
the MTF obtaining table has discrete pixel shift amount and the MTF at the predetermined frequency, corresponding to the discrete pixel shift amount so as to correspond to each other.

5. The image processing device according to claim 1, wherein the predetermined frequency is a frequency of 2 dot/cycle.

6. The image processing device according to claim 1, wherein
in the state in which the positions of the pixels are shifted a predetermined amount from each other, the positions of the pixels are shifted a predetermined amount from each other in an oblique direction.

7. The image processing device according to claim 1, wherein
the correction filter generation section generates the correction filter based on a default filter generated so that the image displayed on the projection surface in the ideal pixel positions has desired sharpness.

8. The image processing device according to claim 1, wherein the image generation sections are provided respectively to a plurality of projectors.

9. The image processing device according to claim 1, wherein the image generation sections are provided to a same projector.

10. A projection system comprising:
a first image generation section which projects a first image on a projection surface;
a second image generation section which projects a second image on the projection surface so as to overlap the first image; and
an image processing device which performs image processing on the first image and the second image,
wherein the image processing device includes
a pixel shift amount calculation section which calculates a pixel shift amount between the first image and the second image,
a modulation transfer function (MTF) obtaining section which obtains MTF at a predetermined frequency by looking up a stored MTF obtaining table and obtaining the MTF at the predetermined frequency which corresponds to the pixel shift amount calculated by the pixel shift amount calculation section,
a correction filter generation section which generates a correction filter adapted to correct the MTF so that the image displayed on the projection surface has desired sharpness, and
a filter applying section which applies the correction filter to image data corresponding to the image.

11. An image processing method comprising:
(a) projecting a first image on a projection surface;
(b) projecting a second image on the projection surface so as to overlap the first image;
(c) calculating a pixel shift amount between the first image and the second image;
(d) obtaining a modulation transfer function (MTF) at a predetermined frequency by looking up a stored MTF obtaining table and obtaining the MTF at the predetermined frequency which corresponds to the pixel shift amount calculated in step (c);
(e) generating a correction filter adapted to correct the MTF so that the image displayed on the projection surface has desired sharpness; and
(f) applying the correction filter to image data corresponding to the image.

* * * * *